United States Patent [19]

Chung et al.

[11] Patent Number: 5,416,171
[45] Date of Patent: May 16, 1995

[54] BLENDING COMPOSITIONS OF POLYAMIDES AND BLOCK COPOLYETHERAMIDES

[75] Inventors: Lie-Zen Chung; De-Lun Kuo; Hong-Bing Tsai, all of Hsinchu, China

[73] Assignee: Industrial Technology Research Institute, Hsinchu, Taiwan, Prov. of China

[21] Appl. No.: 297,423

[22] Filed: Aug. 11, 1994

Related U.S. Application Data

[63] Continuation of Ser. No. 35,360, Mar. 22, 1993, abandoned.

[51] Int. Cl.⁶ .................. C08L 71/02; C08L 77/02
[52] U.S. Cl. ................ 525/425; 525/432; 525/434; 525/426
[58] Field of Search .............. 525/432, 425, 426, 434

[56] References Cited

U.S. PATENT DOCUMENTS

| | | | |
|---|---|---|---|
| 3,636,135 | 1/1972 | Garforth | 525/432 |
| 4,174,358 | 11/1979 | Epstein | 525/183 |
| 4,410,661 | 10/1983 | Epstein et al. | 525/66 |
| 4,478,978 | 10/1984 | Roura | 525/66 |
| 4,536,541 | 8/1985 | Latham | 525/66 |
| 4,554,320 | 11/1985 | Reimann et al. | 525/183 |
| 5,168,108 | 12/1992 | Chacko | 524/538 |

FOREIGN PATENT DOCUMENTS

| | | |
|---|---|---|
| 0476963 | 3/1992 | European Pat. Off. . |
| 2043417 | 2/1987 | Japan . |
| 3063748 | 3/1988 | Japan . |

OTHER PUBLICATIONS

R. J. M. Borggreve et al. (1987) *Polymer,* vol. 28, pp. 1489–1496.
S. Cimmino et al. (1984) *Polymer Engineering and Science,* vol. 24, pp. 48–56.
L-Z. Chung et al. (1992) *Journal of Polymer Science: Part A: Polymer Chemistry,* vol. 30, pp. 951–953.

*Primary Examiner*—James J. Seidleck
*Assistant Examiner*—I. Zemel
*Attorney, Agent, or Firm*—Darby & Darby

[57] ABSTRACT

The invention relates blending compositions comprising (a) a polyamide and (b) a block copolyetheramide with hard polyamide segments and soft polyether segments. The block copolyetheramide is defined by the formula:

$$-[-CO-R^1-CO-(NHR^2CO)_m-O-(R^3-O-)_p-(CO-R^2-NH)_q-]_n-$$

wherein R represents the alkylene group of an aliphatic diacid having between about 2 and about 18 carbon atoms; $R^2$ represents an alkylene group having between about 3 and about 11 carbon atoms; $R^3$ represents an alkylene group having between about 2 and about 4 carbon atoms; m and q independently range between about 2 and about 40; p ranges between about 10 and about 100; and n ranges between about 2 and about 50, said blending composition containing a polyether content ranging between about 1 and about 50%. The blocking copolyetheramides may be prepared by reacting a polyetherdiol, caprolactam and an aliphatic diacid in a two-stage method. The blending compositions show excellent toughness, high impact strength and heat deflection temperature, and are useful as tough engineering nylons.

11 Claims, No Drawings

BLENDING COMPOSITIONS OF POLYAMIDES AND BLOCK COPOLYETHERAMIDES

This is a continuation of application Ser. No. 08/035,360, filed Mar. 22, 1993, abandoned.

DESCRIPTION OF THE INVENTION

Nylon-6 is widely used as an engineering plastic due to its good mechanical properties and abrasion resistance. One of its defects, however, is its low impact strength in the dry state. The blending of nylon-6 with a rubbery polymer or an impact modifier improves the impact strength of nylon-6 and widens its applications. The rubbery domains dispersed in the rigid matrix can stop the craze growth which lead to failure cracks during impact.

To minimize the decay of tensile mechanical properties of the blended materials, a strong adhesion between the matrix and the dispersed phase is essential. Thus, many impact modifiers used in nylon-6 blends contain functional groups such as anhydride or carboxylic acid to enhance the adhesion. Typical examples are polypropylene-g-maleic anhydride (F. Ide et al., *J. Appl. Polym. Sci.*, 18:963, 1974); (ethylene-propylene-diene copolymers)-g-maleic anhydride (EPDM) (S. Cimmino et al., *Polym. Eng. Sci.*, 24:48, 1984; B. J. M. Borggreve et al., *Polymer.*, 28:1489, 1987); EPDM-g-succinic anhydride (B. N. Epstein et al., U.S. Pat. No. 4,410,661; R. A. Latham, U.S. Pat. No. 4,536,541), ethylene-alkyl acrylate-acrylic acid copolymers (H. Reisman et al., U.S. Pat. NO. 4,554,320), ethylene-alkyl acrylate-methacrylic acid copolymers (M. J. Roura, U.S. Pat. No. 4,478,978), and ethylene-alkyl methacrylate-(meth)acrylic acid copolymers, ethylene-vinyl acetate-(meth)acrylic acid copolymers and ionized (meth)acrylic acid copolymers (B. N. Epstein, U.S. Pat. No. 4,174,358).

After blending with nylon-6, the functional groups of the impact modifiers may interact with nylon-6 through chemical reaction or hydrogen-bonding and thus improve the adhesion. Many conventional impact modifiers, however, are marginally compatible with nylons and tend to separate or exude during processing. Moreover, the resultant blends generally exhibit only slightly improved toughness and flexibility and substantially poorer mechanical properties, e.g., modulus of elasticity, tensile strength, hardness and rigidity, relative to the nylons themselves. Accordingly, nylon blends having improved toughness with little or no diminishment of physical properties are needed in the art.

SUMMARY OF THE INVENTION

The present invention relates to blending compositions composed of: (1) a polyamide, e.g., nylon-6; and (2) a block copolyetheramide as impact modifier. The block copolyetheramide is composed of hard polyamide segments —$(COR^2-NH)_m$ and soft polyether segments —$(R^3-O-)_p$ and has the general formula:

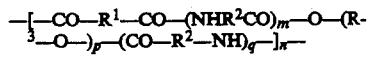

wherein $R^1$ represents the alkylene group of an aliphatic diacid having between about 2 and about 18 carbon atoms; $R^2$ represents an alkylene group having between about 3 and about 11 carbon atoms; $R^3$ represents an alkylene group having between about 2 and about 4 carbon atoms; m and q independently range between about 2 and about 40; p ranges between about 10 and about 100; and n ranges between about 2 and about 50. The polyamide segments of the block copolyetheramide interact with the polyamide, e.g., nylon-6, to improve the impact strength of nylon-6 without a substantial reduction in the physical characteristics, e.g., heat deflection temperature and hardness. The blending compositions of the invention show excellent toughness, high impact strength and high heat-deflection temperature, and are useful as tough engineering nylons.

DETAILED DESCRIPTION OF THE INVENTION

All patents, patent applications, and literature references cited in the specification are hereby incorporated by reference in their entirety.

The present invention provides blending compositions of: (a) a polyamide, e.g., nylon-6; and (b) a block copolyetheramide as impact modifier. The block copolyetheramides are composed of hard polyamide segments —$(COR^2-NH)_m$ and soft polyether segments —$(R^3-O-)_p$ and have a general formula of:

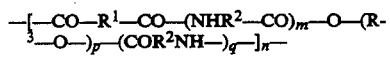

wherein $R^1$ represents the alkylene group of an aliphatic diacid having between about 2 and about 18 carbon atoms; $R^2$ represents an alkylene group having between about 3 and about 11 carbon atoms; $R^3$ represents an alkylene group having between about 2 and about 4 carbon atoms; m and q independently range between about 2 and about 40; p ranges between about 10 and about 100; and n ranges between about 2 and about 50. The block copolyetheramides may be prepared by a two-stage method as described in R.O.C. Patent No. 44701 (or L. Z. Chung et al., *J. Polym. Sci. Part A: Polym. Chem.*, 30:951, 1992).

According to the two-stage method, a polyoxyalkylene glycol is first reacted with caprolactam to form amino-terminated polyamide prepolymers, then the prepolymers are condensed with an aliphatic diacid to obtain the block copolyetheramides.

In preparing the prepolymers, a mixture of a polyoxyalkylene glycol, caprolactam and a catalyst are reacted at a temperature ranging between about 220° C. and about 260° C. for a period of time generally ranging between about 1 and about 4 hours. The amount of polyoxyalkylene glycol employed in the reaction ranges between about 5 and about 85 wt. %, preferably between about 33 and about 45 wt. %. Caprolactam is present in an amount broadly ranging between about 15 and about 95, preferably between about 55 and about 77 wt. %. Phosphoric acid (85%) serves as the catalyst. The amount of the catalyst ranges between about 0.01 and about 0.5 wt. %, preferably between about 0.05 and about 0.2 wt. %.

Suitable, but non-limiting examples of polyoxyalkylene glycol include polyoxyethylene glycol, polyoxypropylene glycol, polyoxytetramethylene glycol with a molecular weight range of 200 to 6000, and their mixtures. A preferred polyoxyalkylene glycol is a polyoxytetramethylene glycol having a molecular weight range of 600–3000.

Thereafter, the block copolyetheramide is prepared by condensing the prepolymer with an aliphatic diacid in a molar amount equal to that of polyoxyalkylene glycol. The condensation reaction is conducted at a temperature ranging between about 240° C. and about 280° C., preferably between about 250° C. and about 270° C., for a period of time generally ranging between about 1 and about 5 hours, but preferably between about 2 and about 4 hours. The condensation reaction is conducted at a reduced pressure ranging between about 0.1 mm Hg and about 5 mm Hg.

Suitable, but non-limiting, aliphatic diacids include succinic acid, glutaric acid, adipic acid, pimelic acid, suberic acid, azelaic acid, sebacic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nondecanedioic acid and 1,20-eicosanedioic acid, and their mixtures. A preferred aliphatic diacid is adipic acid.

The polyamides used in preparing the blending composition of the invention are well known in the art and are generally referred to as nylons. Representative polyamides include semicrystalline and amorphous nylon resins of a molecular weight of at least 5,000 as described, for instance, in U.S. Pat. Nos. 4,410,661; 4,478,978; 4,554,320; and 4,174,358. The nylon resins may be prepared by condensation of equimolar amounts of a dicarboxylic acid of 4 to 12 carbon atoms with an diamine of 4 to 14 carbon atoms. Examples of nylons include polyhexamethyleneadipic acid amide (Nylon 66), polyhexamethyleneazelaic acid amide (Nylon 69), polyhexamethylene sebacic acid amide (Nylon 610), polyhexamethylene dodecanedioic acid amide (Nylon 612), the nylons obtained by subjecting lactams to ring-opening, e.g., polycaprolactam (Nylon 6), polylaurolactam, poly-11-aminoundecanoic acid, and bis(p-aminoacylcohexyl)-menthanedodecanedioic acid amide.

In accordance with the invention, nylons obtained by copolymerization of two of the above polymers, by terpolymerization of the above polymers or their components, e.g., a copolymer of adipic acid, isophthalic acid and hexamethylenediamine, or blended mixtures of polyamides such as a mixture of nylon 66 and nylon 6 may also be used. Preferably, the nylons are linear and have melting points above 200° C. The nylons have a relative viscosity ranging between about 2.5 and about 5.0, preferably between about 3 and about 3.5 as determined from a 1% solution in sulfuric acid at 23° C. A particularly preferred nylon for use in practicing this invention is polycaprolactam (nylon 6).

Thereafter, the blending composition of the invention is prepared by mixing block copolyetheramides with the polyamides using conventional melt-mixing methods, such as by single screw extruders, twin-screw extruders, roll mills, and torsional rheometers, or by direct melt-mixing in screw-type injection molding machines followed by injection molding to products.

Blending compositions of polyamides and block copolyetheramides with improved toughness require a sufficient amount of soft segments as domains to absorb impact energy. Thus, in practicing this invention, the amount of block copolyetherester used in preparing the blends should be sufficient to provide a polyether content broadly ranging between about 1 to 50 wt % of the blend, preferably between about 4 and about 25 wt %. When the polyether content of the blends is over 3 wt %, a significant toughening effect is obtained. For instance, a blending composition of nylon-6 with a typical block copolyetheramide, e.g., BCEA1 in Example 1, at a polyether content of 3 wt % in the blend displayed an impact strength of about 3 times greater than that of nylon-6. When the polyether content is increased to 5–10 wt %, the blend shows an impact strength of about 6–10 times greater than that of nylon-6. However, when the polyether content is over 25 wt %, the heat-deflecting temperature of the blends is depressed considerably, and blends with a heat-deflecting temperature below 150° C. may be obtained. When the polyether content is below 25 wt %, the heat-deflection temperature of the of the blends is above 180° C. and only about 6°–20° C. lower than that of nylon-6.

The charge content of caprolactam used in preparing the block copolyetheramides modulates the toughening effect on polyamide, e.g., nylon-6, in the blending composition. When the charged content of caprolactam used is over 55 wt %, the block copolyetheramides show excellent toughening effect on nylon-6. However, when the charged content of caprolactam is below 55 wt %, the block copolyetheramides improve the toughness of nylon-6 to a lesser extent. Thus, in practicing this invention, the charged content of caprolactam employed in the preparation of the block copolyetheramides broadly ranges between about 15 and about 95% wt %, and preferably between about 55 and about 75 wt %.

Without being bound by any theory of operation for the invention, the polyamide segments of the impact modifier combine with nylon-6 to form a matrix while the polyether segments of the impact modifier form rubbery dispersed domains which absorbs the impact energy and stop the propagation of crazes. The excellent toughness exhibited by the inventive blending compositions may be attributed to the good adhesive interaction between the polyamide matrix and the polyether domains of the block copolyetheramides. Furthermore, the little or no observable heat-deflecting temperature depression in the blending composition may be attributed to the substantial lack of interaction between the polyether domains of the block copolyetheramides and the polyamide matrix.

The following examples are illustrative of the present invention, however, it will be understood that the invention is not limited to the specific details set forth in the examples.

EXAMPLE 1

Preparation of Block Copolyetheramides and Nylon Blends (a) Preparation of Block Copolyetheramides Poly(tetramethylene ether) glycols (PTMEGs) with molecular weights of 1000 and 2000, respectively, were supplied by DuPont. Caprolactam was obtained from China Petrochemical Development Corp. (Taiwan). Adipic acid and 85% phosphoric acid were Merck reagent grade.

The block copolyetheramides (BCEA) used in this Example are prepared by a two-stage method described in R.O.C. Patent No. 44701 (or L. Z. Chung et al., *J. Polym. Sci. Part A: Polym. Chem.*, 30:951, 1992). The charged compositions of five block copolyetheramides used in the following examples are listed in Table 1.

A typical example of a synthesis procedure of a nylon-6 based block copolyetheramide (e.g., BCEA1 in Table 1) is as follows: 30 g (0.03 mol) of PTMEG 1000, 65.62 g (0.579 mol) of caprolactam, and 0.1 g (0.00087 mol) of 85% phosphoric acid were reacted in 1 L stainless reactor at 240° C. at stirring speed of 200 rpm. After the reaction proceed for 2 h, 4.38 g (0.03 mol) of adipic acid was added into the reactor, then the reaction temperature was raised to 260° C. and vacuum (1 mm Hg) was applied for 2 h.

TABLE 1

The charged compositions of the block copolyetheramides in the preparation by the two-stage method.

| Block copolyetheramide | | BCEA1 | BCEA2 | BCEA3 | BCEA4 | ECEA5 |
|---|---|---|---|---|---|---|
| Caprolactam | (wt %) | 65.62 | 54.15 | 42.69 | 31.23 | 46.35 |
| PTMEG 1000[a] | (wt %) | 30 | 40 | 50 | 60 | 0 |
| PTMEG 2000[b] | (wt %) | 0 | 0 | 0 | 0 | 50 |
| Adipic Acid | (wt %) | 4.38 | 5.85 | 7.31 | 8.75 | 3.65 |

[a] a polyoxytetramethylene glycol with a molecular weight of 1000.
[b] a polyoxytetramethylene glycol with a molecular weight of 2000.

(a) Blending Procedure and Determination of Blend Properties

Nylon-6 and the block copolyetheramide were melt-mixed at 230° C. thoroughly to obtain the blends. The blends were compression molded into sheets at 240° C. which were then cut into the required test specimens. The notched Izod impact strength of 25° C. of the specimens were determined according to ASTM D-256. The heat-deflection temperature at a load of 66 psi of the test specimens was determined according to ASTM D-648. The Shore D hardness at 25° C. of the test specimens was measured according to ASTMD-2240.

For comparison purposes, nylon-6 was compression molded into sheets, and the properties were determined. The impact strength, heat deflection temperature and Shore D hardness were found to be 1.4 ft.ib/in, 202° C. and 76, respectively.

EXAMPLE 2

Nylon-6/BCEA1 Blends

Nylon-6 was blended with various amounts of BCEA1 (a block copolyetheramide with a charged composition shown in Table 1) using the blending procedure described in Example 1(b). The compositions and properties of the blends (B1–B3) are shown in Table 2.

TABLE 2

The compositions and properties of the blends of nylon-6 and BCEA1.

| | B1 | B2 | B3 |
|---|---|---|---|
| Composition: | | | |
| Nylon 6 (wt %) | 90 | 67 | 33 |
| BCEA1 (wt %) | 10 | 33 | 67 |
| Polyether content (wt %) | 3 | 10 | 20 |
| Properties: | | | |
| Impact Strength (ft*lb/in) | 3.8 | 17 | 12 |
| HDT* at 66 psi (°C.) | 195 | 190 | 173 |
| Shore D Hardness | 75 | 72 | 62 |

*Heat deflection temperature

The polyether segments of the block copolyetheramide are the major component for absorbing impact energy, thus the polyether content of the blends is important in determining the properties. As shown in Table 2, when the polyether content in the blends is 10 wt % or more, the impact strength of the blends is very high, and about an order greater than that of nylon-6. Thus, BCEA1 improve the toughness of nylon-6 considerably. The heat deflection temperature and the Shore D hardness decrease as the polyether content increases; however, the magnitude of the decrease is insignificant.

EXAMPLE 3

Nylon-6/BCEA2 Blends

Nylon-6 was blended with various amounts of BCEA2 (see Table 1), using the blending procedure described in Example 1(b). The compositions and properties of the blends (B4–B6) are shown in Table 3. As shown in Table 3, BCEA2 increased the impact strength of nylon-6 considerably. As the polyether content increases, the heat deflection temperature and Shore D hardness decrease somewhat.

TABLE 3

The compositions and properties of the blends of nylon-6 and BCEA2.

| | B4 | B5 | B6 |
|---|---|---|---|
| Composition: | | | |
| Nylon 6 (wt %) | 75 | 50 | 25 |
| BCEA2 (wt %) | 25 | 50 | 75 |
| Polyether content (wt. %) | 15 | 30 | 45 |
| Properties: | | | |
| Impact Strength (ft*lb/in) | 10 | 14 | 11 |
| HDT* at 66 psi (°C.) | 189 | 158 | 116 |
| Shore D Hardness | 72 | 65 | 55 |

EXAMPLE 4

Nylon-6/BCEA3 Blends

Nylon-6 was blended with various amounts of BCEA3 (see Table 1), using the blending procedure described in Example 1(b). The compositions and properties of the blends (B7–B10) are shown in Table 4. As shown in Table 4, BCEA3 improves the toughness of nylon-6 significantly. However, the toughening effect of BCEA3 on nylon-6 is not as dramatic as seen for that of BCEA1 and BCEA2.

TABLE 4

The compositions and properties of the blends of nylon-6 and BCEA3.

| | B7 | B8 | B9 | B10 |
|---|---|---|---|---|
| Composition: | | | | |
| Nylon 6 (wt %) | 80 | 60 | 40 | 20 |
| BCEA3 (wt %) | 20 | 40 | 60 | 80 |
| Polyether content (wt %) | 10 | 20 | 30 | 40 |
| Properties: | | | | |
| Impact Strength (ft*lb/in) | 4.4 | 3.6 | 3.3 | 5.4 |
| HDT* at 66 psi (°C.) | 194 | 182 | 99 | 97 |
| Shore D Hardness | 72 | 71 | 56 | 46 |

EXAMPLE 5

Nylon-6/BCEA4 Blends

Nylon-6 was blended with various amounts of BCEA4 (see Table 1), using the blending procedure described in Example 1(b). The compositions and properties of the blends (B11–B15) are shown in Table 5. As shown in Table 5, BCEA4 improves the toughness of nylon-6 only slightly.

TABLE 5

The compositions and properties of the blends of nylon-6 and BCEA4.

|  | B11 | B12 | B13 | B14 | B15 |
|---|---|---|---|---|---|
| Composition: |  |  |  |  |  |
| Nylon 6 (wt %) | 83 | 67 | 50 | 33 | 17 |
| BCEA4 (wt %) | 17 | 33 | 50 | 67 | 83 |
| Polyether content (wt %) | 10 | 20 | 30 | 40 | 50 |
| Properties: |  |  |  |  |  |
| Impact Strength (ft*lb/in) | 2.3 | 2.0 | 1.7 | 1.8 | 2.2 |
| HDT* at 66 psi (°C.) | 194 | 158 | 117 | 77 | 71 |
| Shore D Hardness | 68 | 63 | 57 | 46 | 31 |

EXAMPLE 6

Nylon-6/BCEA5 Blends

Nylon-6 was blended with various amounts of BCEA5 (see Table 1), using the blending procedure described in Example 1. The compositions and properties of the blends (B16-B19) are shown in Table 6. A shown in Table 6, BCEA5 improves the toughness of nylon-6 significantly.

TABLE 6

The compositions and properties of the blends of nylon-6 and BCEA5.

|  | B16 | B17 | B18 | B19 |
|---|---|---|---|---|
| Composition: |  |  |  |  |
| Nylon 6 (wt %) | 80 | 60 | 40 | 20 |
| BCEA5 (wt %) | 20 | 40 | 60 | 80 |
| Polyether content (wt %) | 10 | 20 | 30 | 40 |
| Properties: |  |  |  |  |
| Impact Strength (ft*lb/in) | 3.6 | 3.7 | 5.0 | 5.0 |
| HDT* at 66 psi (°C.) | 189 | 176 | 77 | 57 |
| Shore D Hardness | 70 | 65 | 58 | 45 |

What is claimed is:

1. A blending composition comprising:
   (a) a polyamide; and
   (b) a block copolyetheramide impact modifier having hard polyamide segments and soft polyether segments, said block copolyetheramide defined by the formula:

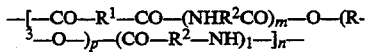

wherein $R^1$ represents the alkylene group of an aliphatic diacid having between about 2 and about 18 carbon atoms; $R^2$ represents an alkylene group having between about 3 and about 11 carbon atoms; $R^3$ represents an alkylene group having between about 2 and about 4 carbon atoms; m and q independently range between about 2 and about 40; p ranges between about 10 and about 100; and n ranges between about 2 and about 50, said blending composition containing a polyether segment content ranging between about 1 and about 50 wt %; wherein said copolyetheramide is formed by a two-stage method; wherein the stages comprise;
   (i) reacting a polyoxyalkylene glycol with caprolactam to form an amino-terminated polyamide prepolymer consisting essentially of hard polyamide segments and soft polyether segments, having the formula:

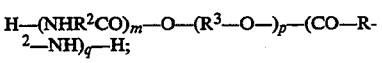

wherein m, p and q are as defined above; and
   (ii) condensing the prepolymer with an aliphatic diacid to obtain said block copolyetheramides.

2. The blending composition of claim 1, wherein the block copolyetheramide is prepared by condensing equimolar amounts of the aliphatic diacid and the prepolymer based on the amount of the polyoxyalkylene glycol in the prepolymer.

3. The blending composition of claim 1, wherein the polyether segment content is said blending composition ranges between about 4 and about 25 wt %.

4. The blending composition of claim 1, wherein the polyamide comprises nylon.

5. The blending composition of claim 4, wherein the polyamide is nylon-6.

6. The blending composition of claim 1, wherein $R^2$ is an alkylene group having about 5 carbon atoms and $R^3$ is an alkylene group having about 4 carbon atoms.

7. The blending composition of claim 1, wherein the block copolyetheramide is a reaction product of polyoxyalkylene glycol, caprolactam and an aliphatic diacid.

8. The blending composition of claim 7, wherein the polyoxyalkylene glycol is selected from the group consisting of polyoxyethylene glycol, polyoxypropylene glycol, polyoxytetramethylene glycol and mixtures thereof.

9. The blending composition of claim 7, wherein the aliphatic diacid is selected from the group consisting of succinic acid, glutaric acid, adipic acid, pimelic acid, suberic acid, azelaic acid, sebacic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nondecanedioic acid, 1,20-eicosanedioic acid, and mixtures thereof.

10. The blending compositions of claim 7, wherein the amount of caprolactam used in preparing the block copolyetheramide ranges between about 15 and about 95 wt %. of the copolyetheramide.

11. The blending compositions of claim 10, wherein the amount of caprolactam ranges between about 55 and about 77 wt %.

* * * * *